F. D. MAART.
FLY TRAP.
APPLICATION FILED APR. 5, 1909.

984,950.

Patented Feb. 21, 1911.

2 SHEETS—SHEET 1.

WITNESSES

Frederick D. Maart
INVENTOR

BY
Lewis J. Doolittle
ATTORNEY.

F. D. MAART.
FLY TRAP.
APPLICATION FILED APR. 5, 1909.

984,950.

Patented Feb. 21, 1911.

2 SHEETS—SHEET 2.

WITNESSES

Frederick D. Maart INVENTOR

BY

Lewis J. Doolich
ATTORNEY

UNITED STATES PATENT OFFICE.

FREDERICK D. MAART, OF NEW YORK, N. Y.

FLY-TRAP.

984,950.  Specification of Letters Patent.  Patented Feb. 21, 1911.

Application filed April 5, 1909. Serial No. 487,904.

*To all whom it may concern:*

Be it known that I, FREDERICK D. MAART, a citizen of the United States, and resident of the city, county, and State of New York, have invented certain new and useful Improvements in Fly-Traps, of which the following is a specification.

This invention relates to fly-traps; and the object is to provide a simple and efficient trap of novel construction, in which the entrances may be readily and quickly closed when a sufficient number of flies have entered.

The invention may be said to consist of a two-part cage trap, supports adapted to sustain one part from the other with entrance space between, and other supports for sustaining the one part from the other when closed thereupon. Preferably, the second supports are in the nature of latching devices; and preferably, also, a single catch is formed with both supports.

Other and more particular features of the invention will become apparent as the specification proceeds.

Figure 1:
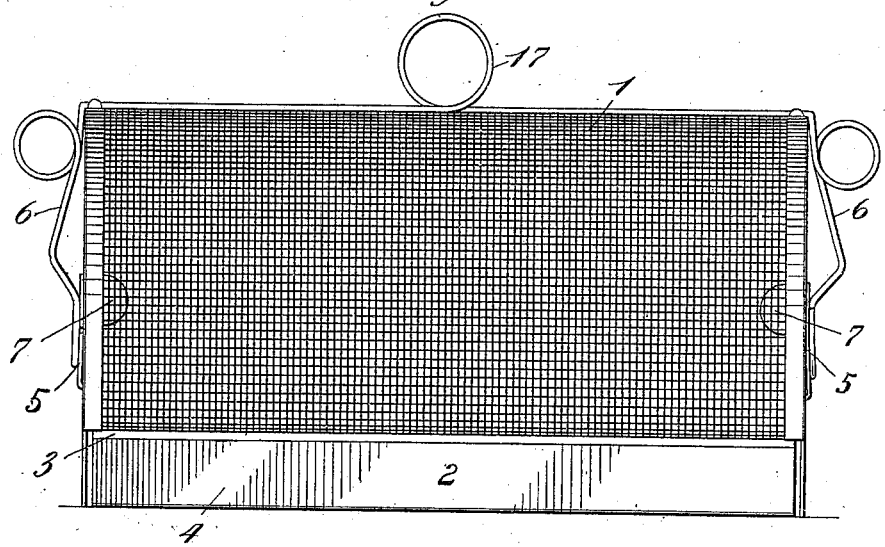
Figure 2:
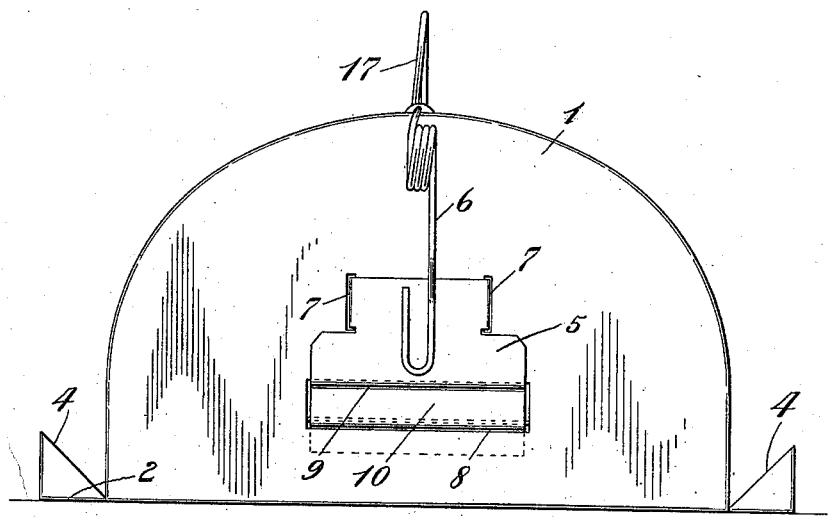
Figure 3:
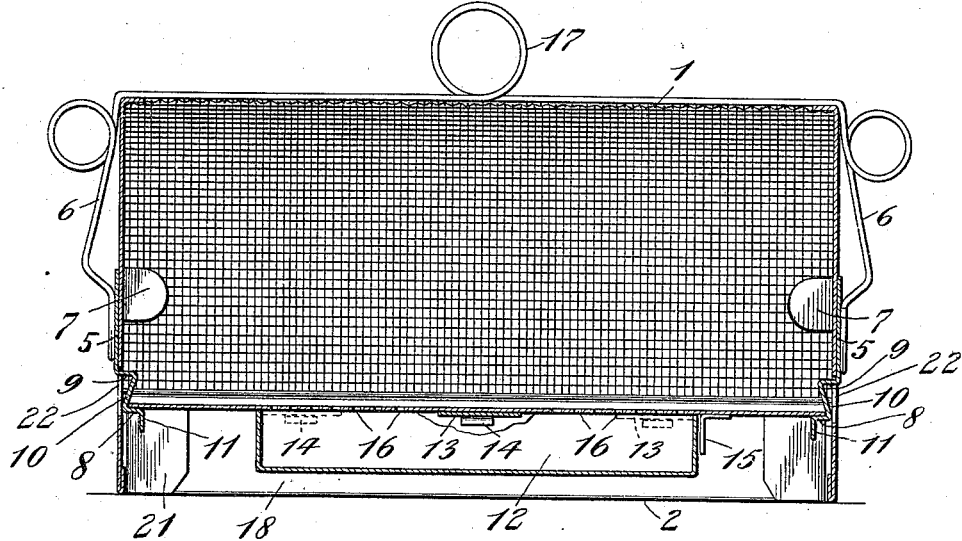
Figure 4:
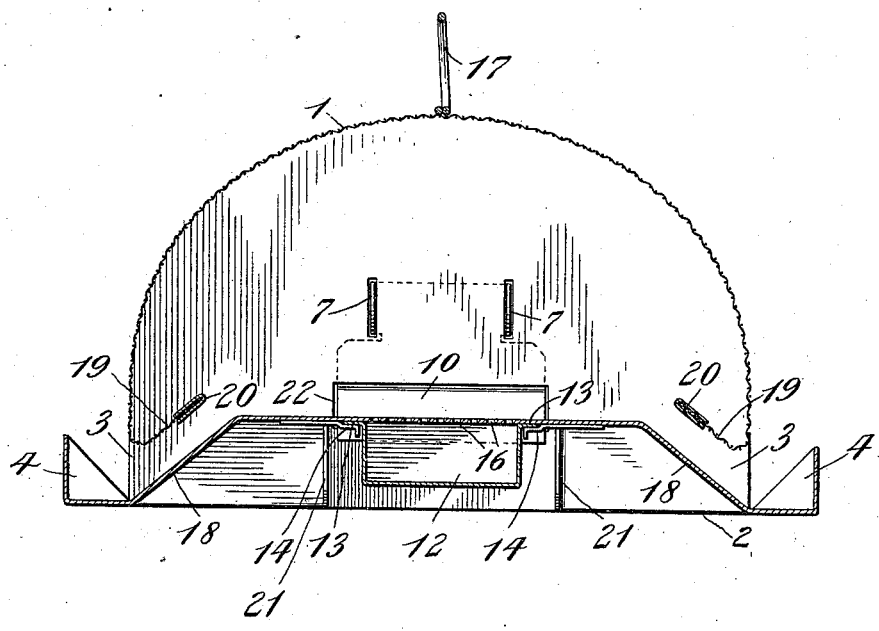

In the drawings illustrating an embodiment of the invention, Figure 1 is a side elevation of the trap, Fig. 2 is an end elevation, Fig. 3 is a longitudinal section, and Fig. 4 is a transverse section.

Referring to these views, the numeral 1 will be found to designate one part of the trap or the cage proper, and the numeral 2 the other part, or bottom. The cage proper 1 may be made in a variety of shapes; that illustrated has vertical end walls and arched sides and top, and the sides and top are desirably of foraminous material.

The numeral 3 designates the entrance spaces between the two parts of the cage trap; these spaces being formed, preferably, between the lower edges of the foraminous sides of the cage proper and the lateral marginal regions of the bottom 2. Preferably, though not necessarily, the lateral marginal regions of the bottom 2 are projected beyond the cage proper 1 and formed into, or provided with, trough-like ledges 4.

5 are the catches hereinbefore referred to, being preferably spring actuated and carried by the cage part 1 for engagement with the bottom 2. Convenient means of mounting the catches is found in the spring brackets 6; and the catches may be held against lateral displacement by ears 7 working in suitable slots in the end walls of the cage part 1. These catches 5 are provided with lower internal ledges 8 and upper internal ledges 9; and between the rear edge of the former and the front edge of the latter extends an inclined latching surface 10. The portions of the catches bearing the parts 8, 9 and 10 preferably project inward through suitable openings 22 in the end walls of the cage part 1, and may be provided at the forward edges of the ledges 8 with downward extending flanges 11 for engagement with the lower margins of the openings 22, to limit the outward movement of the catches. The catches are desirably bent from sheet metal, but obviously this is not material.

It will be seen that the ledges 8 constitute the supports hereinbefore referred to for sustaining the cage part 2 from the cage part 1, with entrance space between; and the ledges 9 constitute the other supports for sustaining the cage part 2 when closed upon the part 1. This last operation is effected by simply pushing upward upon the bottom 2, causing it to ride over the latching surfaces 10, forcing the catches outward, to spring back with the ledges 9 beneath the bottom 2.

Any suitable provision for bait may be made, but I prefer to mount a box or trough 12 beneath the bottom 2; said box having top flanges 13 which slide over other supporting flanges 14 secured to the under side of the bottom 2. It may be desirable to provide an end stop 15, for limiting the movement of the box in one direction. Over the box or trough, the bottom 2 may be formed with perforations 16.

I regard it as desirable to form the entrance openings 3 between upward and inward inclined surfaces 18, connecting the raised central portion of the bottom 2 with the trough-like ledges 4, and correspondingly inclined inward extensions 19 from the lower edges of the foraminous side walls of the cage part 1. The upper edges of these extensions 19 are desirably provided with a metal binding 20.

For the purpose of holding the bottom 2 against lateral movement, I may provide it beneath with wings 21 or other stops for engagement with the side edges of the portions of the catches 5 projecting through the openings 22.

A suitable handle or hanger 17 may be provided at the top of the cage part 1; and, if desired, this member may be formed from the same piece of wire as the spring brackets 6.

What I claim as new is:

1. A fly-trap comprising a cage proper, a vertically movable bottom, and spring catches having lower and upper supporting ledges, said lower ledge being adapted to sustain the bottom somewhat below the cage proper to afford entrance space and said upper ledges being adapted to sustain the bottom closed against said cage.

2. A fly-trap comprising a cage proper, a vertically movable bottom, and spring catches mounted on the cage proper and having lower and upper supporting ledges with inclined latching surfaces between, said lower ledge being adapted to sustain the bottom somewhat below the cage proper to afford entrance space and said upper ledges being adapted to sustain said bottom closed against said cage.

3. A fly-trap comprising a cage proper, a vertically movable bottom, and catches resiliently mounted on the outer sides of opposite walls of the cage proper and provided with portions projecting inward through openings in such walls, such portions being provided with lower and upper supporting ledges, for sustaining the bottom somewhat below and closed up against the cage proper, respectively, said catches also having ears or lugs projecting through openings in the walls of the cage proper and adapted to hold the same against lateral displacement.

4. A fly-trap comprising a cage proper, a vertically movable bottom, and catches resiliently mounted on the outer sides of opposite walls of the cage proper and provided with portions projecting inward through openings in such walls, such portions being provided with lower and upper supporting ledges, for sustaining the bottom somewhat below and closed up against the cage proper, respectively, said catches also having stops adapted to engage the wall of said cage and to limit the outward movement thereof.

5. A fly-trap comprising a cage proper, a vertically movable bottom, and catches resiliently mounted on the outer sides of opposite walls of the cage proper and provided with portions projecting inward through openings in such walls, such portions being provided with lower and upper supporting ledges, for sustaining the bottom somewhat below and closed up against the cage proper, respectively, the said bottom being provided with wings or stops adapted to engage the opposite sides of the catches to hold the bottom against lateral movement.

Signed at New York, in the county and State of New York, this 31st day of March, 1909.

FREDERICK D. MAART.

Witnesses:
 LEWIS J. DOOLITTLE,
 A. W. SOUTHARD.